Oct. 19, 1965 B. E. MURTHA 3,212,990
FUEL ELEMENT CLUSTER
Filed Nov. 21, 1961 2 Sheets-Sheet 1
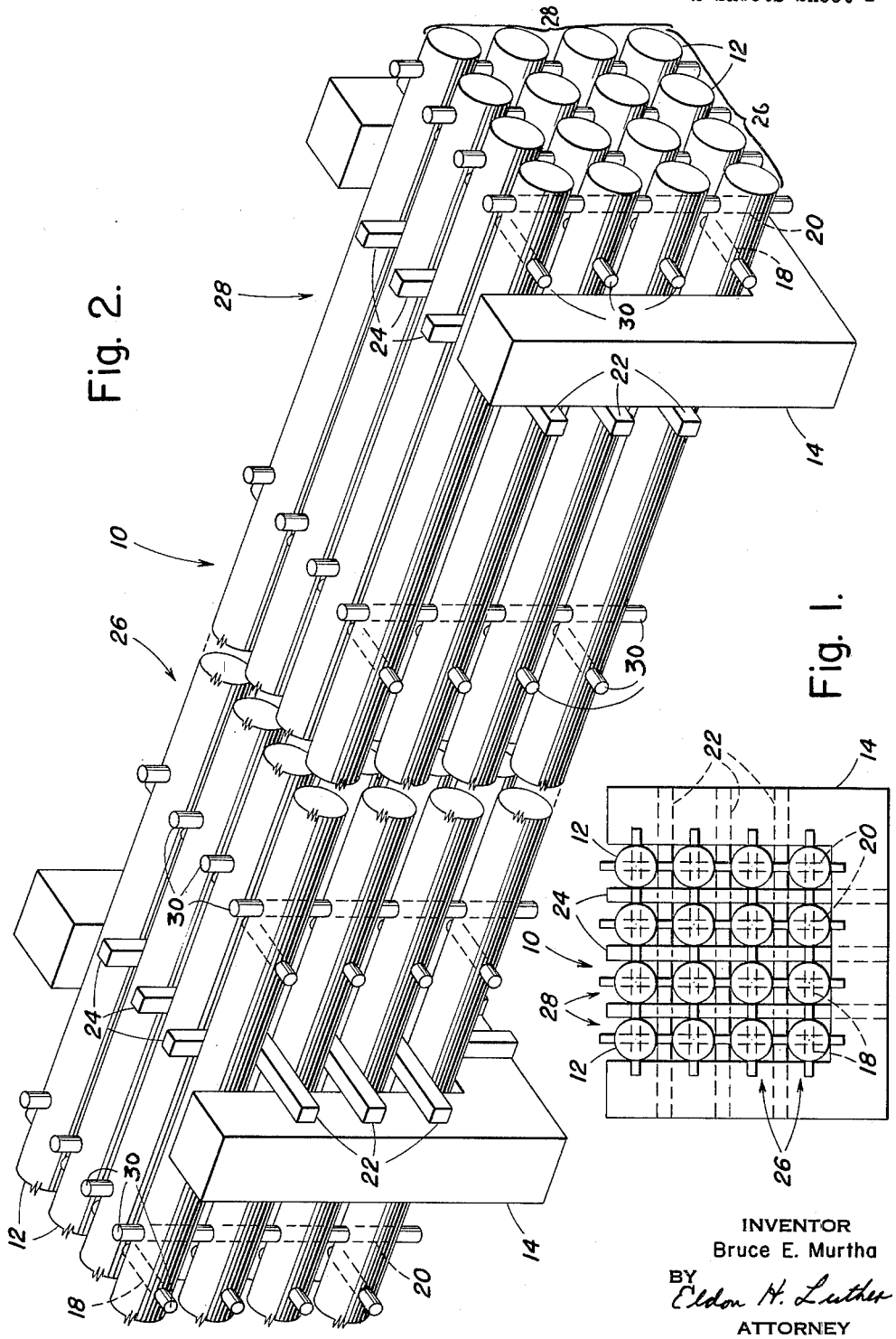
INVENTOR
Bruce E. Murtha
BY
Eldon H. Luther
ATTORNEY Oct. 19, 1965                    B. E. MURTHA                    3,212,990
                              FUEL ELEMENT CLUSTER
Filed Nov. 21, 1961                                        2 Sheets-Sheet 2
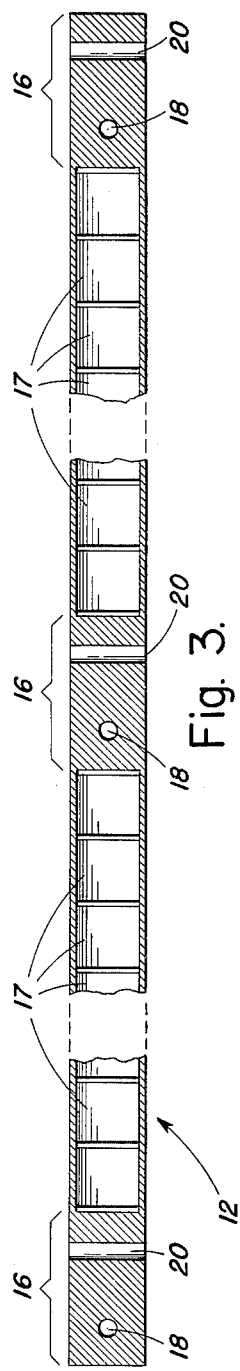
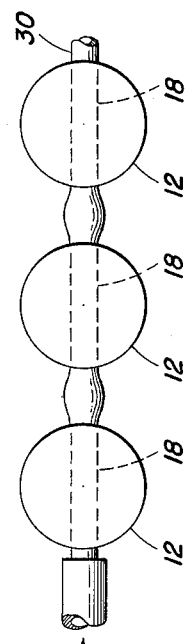
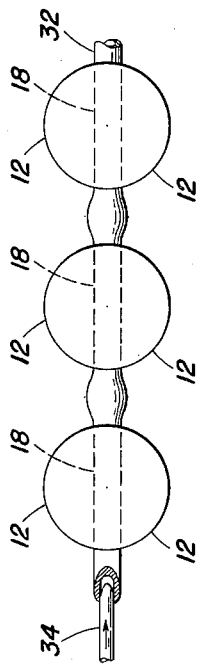
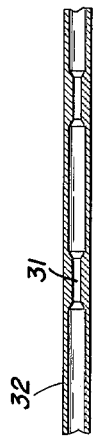
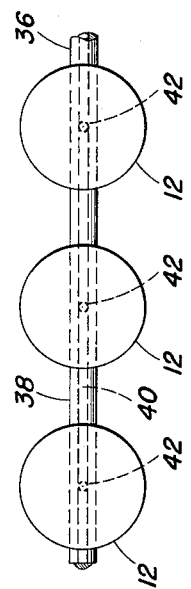
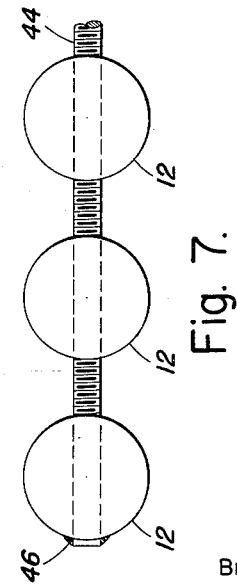
INVENTOR
Bruce E. Murtha
BY
Eldon H. Luther
ATTORNEY

United States Patent Office 3,212,990
Patented Oct. 19, 1965

3,212,990
FUEL ELEMENT CLUSTER
Bruce E. Murtha, Wethersfield, Conn., assignor to Combustion Engineering, Inc., Windsor, Conn., a corporation of Delaware
Filed Nov. 21, 1961, Ser. No. 153,958
6 Claims. (Cl. 176—78)

This invention relates generally to the nuclear reactor art and has particular relation to a fuel element assembly or cluster for the core of a reactor and to an improved method of fabricating the assembly.

In accordance with the invention the fuel element assembly is comprised of a plurality of separate fuel elements which are maintained in fixed relation to each other in a predetermined lattice with the elements being in spaced parallel relation so as to permit the flow of a cooling medium, which is preferably also a neutron moderator, about the elements with the spacing of the elements being accurately maintained and with the assembly being fabricated in an economic and relatively simple yet entirely satisfactory manner.

Each of the elements is of a longitudinally segmented construction with there being separate or segmented fuel portions separated by means of solid plugs or solid portions of the element. These solid portions are drilled so that tubing or rods may be inserted through these drilled openings and in a direction transverse to the longitudinal axis of the element with the purpose of these rods being to fix the elements in a desired lattice. The fuel elements are stacked into this desired geometric lattice and in desired spaced relation with the aid of a suitable jig and spacers. As thus arranged the fuel elements are disposed in rows which extend in two directions or in other words are bidirectional and the arrangement is such that the bores or drilled openings provided in the solid portions of the elements are in alignment for the elements disposed in each row. The fastening rods or tubes are then inserted through the aligned or drilled openings in each of the rows and the rods are effectively secured to the elements so as to maintain the elements in fixed relative positions. The particular way in which the rods are secured to the elements and the particular method of securing the rods to the elements may include either mechanically fastening the two together or metallurgically bonding the two. The mechanical fastening may be effected by expanding the portion of the fastening tubes on each side of the elements with this expansion being accomplished either through fluid pressure or by mechanical means or the fastening rods may be threaded through the drilled openings in the elements. In lieu of mechanically securing the fastening rods to the elements, they may be brazed together if desired.

Accordingly it is an object of this invention to provide an improved fuel element assembly or cluster for use in the core of a nuclear reactor and an improved method of fabricating such a cluster.

Other and further objects of the invention will become apparent to those skilled in the art as the description proceeds.

With the aforementioned objects in view, the invention comprises an arrangement, construction and combination of the elements of the inventive organization in such a manner as to attain the results desired as hereinafter more particularly set forth in the following detailed description of an illustrative embodiment, said embodiment being shown by the accompanying drawing wherein:

FIG. 1 is an end elevational view of a fuel assembly arranged in a predetermined array with the assembly being illustrated as positioned in a jig that is utilized during the assemblying process;

FIG. 2 is a perspective view of the organization of FIG. 1 showing that the fastening rods or tubes are disposed at predetermined locations spaced longitudinally along the tubes and with this view being fragmentary in nature;

FIG. 3 is a somewhat detailed sectional view of one of the fuel elements or tubes that is employed in assemblying the fuel element cluster with the fissionable material in this illustration being shown in elevation for the purpose of clarity;

FIG. 4 is a fragmentary view showing three of the fuel elements and illustrating the process where the elements are secured to the fastening means by expanding a fastening tube through the application of hydraulic or other fluid pressure to the tube interior;

FIG. 5 is a view of the general nature of that of FIG. 4 but illustrating a different process whereby the expanding of the fastening tube is accomplished by mechanical means;

FIG. 5a is a detailed section showing the interior construction of the fastening tube utilized in the expanding process of FIG. 5;

FIG. 6 is also a view in the nature of that of FIG. 4 showing a further modification of the method of securing the fastening tube or rod to the fuel element with this illustration depicting the brazing of the fastening rod to the element; and FIG. 7 is also a view in the nature of that of FIG. 4 showing still another modification where the fuel elements are secured to the fastening rods by being threadedly interconnected therewith.

Referring now to the drawings, wherein like reference characters are used throughout to designate like elements, the illustrative and preferred organization as represented therein and which is utilized to depict both the improved structural organization of the invention together with the improved method of fabricating the same includes a fuel element cluster identified generally as 10 in FIG. 1 and which, as shown in this figure, is of rectangular array with the tubular fuel elements 12 being in spaced relation and with the assembly being shown in a suitable jig 14 utilized in the process of fabricating the assembly.

Each of the tubular fuel elements 12 (FIG. 3) are relatively long members, such as 4 to 10 feet, and are relatively small in diameter, as for example ½ inch. The elements are segmented or compartmented so that they have, throughout their length, at various locations solid regions or areas 16 (FIG. 3) and between these solid regions the hollow portion of the element is filled with a suitable fissionable material such as uranium oxide, with pellets 17 of this material being represented as positioned in these portions of the fuel element although it will be understood that other forms of material such as compacted powder may be utilized. The solid portions 16 of the element are provided with drilled holes 18 and 20, which are transverse of the axis of the fuel element and extend through the solid region with these drilled openings being, as illustrated, generally at right angles to each other.

In fabricating the element 12, which may be made of stainless steel, zirconium or other suitable material for use in the core of a nuclear reactor, the element may be assembled in pieces with the solid portions 16 being secured, as by welding or brazing, to hollow casing sections that form the hollow portions of the element or a continuous length of tube may be plugged at the regions 16 to form the solid tube portions with the plugs being brazed in place or suitably secured within the tube in a fluid tight manner by any other suitable means or process.

The fuel elements 12 are assembled into the desired array by means of the jigs 14, with there being a plurality of these jigs at spaced locations throughout the length of the element. The elements are retained in spaced relation by means of the horizontal spacers 22 and the vertical spacers 24. In placing the elements in the jig the assembly is built up in vertically spaced horizontal rows identified as 26 (FIG. 1) with the array being such that the elements are aligned also in vertical rows identified as 28. The solid regions 16 of each of the elements 12 in the assembly are at the same or corresponding location longitudinally of the tubes and the holes 18 and 20 are accurately positioned so that when the elements are placed in the jig in their proper relation the drilled holes 18 in each of the elements in each horizontal row 16 are in alignment and likewise the holes 20 in each of the vertical rows 28 are in alignment.

The fuel element assembly or cluster is secured together by inserting elongated fastening means through these aligned openings in each of the rows of tubes with this elongated fastening means being effectively secured to the tubular fuel elements so as to form a rigid structure with the elements being in fixed, accurate relation with respect to each other.

There are a number of ways in which the elongated fastening member may be secured to the tubular fuel elements. In FIG. 4 there is diagrammatically illustrated one method of effecting this result. As shown in this figure, the elongated fastening member comprises a tube identified as 30 with this tube initially being of such a diameter that it may be inserted in the openings provided in the solid regions 16 of the fuel element with the tube being illustrated as being inserted through the openings 18. The tube 30 is capped at one end and after being inserted through the fuel elements in one row of the assembly the other end of the tube is connected to a suitable pressure source and pressure is applied to the interior of the tube thereby expanding the tube into tight engagement with the walls of the drilled holes or openings 18 and further expanding the tube intermediate the fuel elements to a diameter greater than the diameter of the drilled hole thereby positively preventing relative movement between fuel element 12 and the fastening tube 30.

In lieu of expanding the fastening tube by means of hydraulic pressure the arrangement may be such that the tube may be expanded mechanically with FIG. 5 illustrating such an arrangement and process. In this FIG. 5 illustration the fastening tube is identified as 32 and as in the FIG. 4 embodiment this tube initially has a diameter which permits it to be inserted through the drilled openings in the fuel elements. The tube does not have a uniform inside diameter and cross-section but it has a necked down or decreased internal diameter at the regions 31 which lie between the fuel elements 12 when the tube 32 is inserted in place in the drilled openings 18 or 20 in one row of the fuel element cluster. After thus properly positioning the tube 32, a pin or mandrel 34 is driven through the tube with this pin having a diameter greater than the necked down diameter of the tube 32 so that this region of the tube is expanded, increasing the diameter of the tube intermediate the elements 12 to a diameter greater than that of the openings 18 and 20 and thereby effectively preventing relative movement between the fuel elements 12 and the fastening member 32.

Still another way in which the fuel elements may be secured to the elongated fastening members is disclosed in FIG. 6, which illustrates the brazing of the fuel elements to the fastening members. In this embodiment the fastening member is identified as 36 and has an inner core of a suitable brazing alloy. For example the outer portion 38 of the member 36 may be stainless steel while the inner portion 40 may be a nickel-chrome base or silver base alloy. Suitable openings or holes 42 are provided through the outer portion 38 of the member 36 at the locations of the fuel elements when the member 36 is positioned within the openings 18 and 20 in one of the rows of elements. After positioning all of the elements 36 in place the entire assembly or cluster is heated to a brazing temperature thereby melting the brazing alloy core of the elements 36 which will then pass through the lateral openings 42 and thereby effectively braze the members 36 to the tubular fuel elements. In lieu of heating the brazing alloy to brazing temperature in this manner this may be accomplished by resistance heating the outer portion 38 with this having the advantage of eliminating the need for a large furnace and also minimizing tube warpage.

Still another method of securing the tubular fuel elements to the fastening members is to thread the fastening member or rod 44, as shown in FIG. 7, and provide complementary threads in the aligned openings 18 and 20 and thereafter screw the fastening rods 44 into the aligned openings in each of the rows of elements. In order to lock the fastening rods in place the end of the rod may be spot welded at 46 to the fuel elements.

It will be seen that in accordance with applicant's invention an improved fuel element cluster together with an improved method of fabricating the same is provided which, while being relatively simple, is effective to maintain the elements in accurately spaced relation.

While I have illustrated and described a preferred embodiment of my invention it is to be understood that such is merely illustrative and not restrictive and that variations and modifications may be made therein without departing from the spirit and scope of the invention. I therefore do not wish to be limited to the precise details set forth but desire to avail myself of such changes as fall within the purview of my invention.

What I claim is:

1. A fuel element assembly comprised of a plurality of elongated, parallel casing members each of which has hollow portions between which are disposed solid portions with the hollow portions having contained therein a fissionable material, and with the solid portions providing a fluid tight separation of the hollow portions, said elements being arranged in bidirectional rows, means maintaining the elements of the assembly in fixed, spaced relation to each other including elongated rigid support elements extending laterally of the rows being received in aligned openings in the solid portions of the elements said support elements being effectively joined with the fuel elements in a manner preventing relative movement therebetween.

2. The organization of claim 1 wherein the elongated support elements comprise tubes that are enlarged at the locations intermediate the fuel elements.

3. The organization of claim 1 wherein the elongated support elements are bonded to the fuel elements.

4. The organization of claim 1 wherein the elongated support elements are provided with threads of constant pitch and are threadedly received in the solid portions of the elements.

5. A fuel element cluster or assembly comprising in combination a plurality of parallel, spaced coextensive tubular fuel elements, said elements having solid regions disposed at common locations throughout their length with the portions of the elements intermediate these solid regions having fissionable material disposed therein, there being a plurality of solid regions intermediate the ends of the elements with the solid regions providing a fluid tight separation of the adjacent regions of the element containing fissionable material, said elements being rigidly retained in fixed relation with respect to each other by means of elongated connecting members extending transversely of the tubes, said tubes being retained in a geometric lattice wherein the tubes are in rows in two directions, each of the elements being provided with bores through the solid regions thereof with the bores of the elements in each row being in alignment and said elongated connecting members being received in and extending through said bores with said members being effectively connected with the tubular elements in a manner which prevents relative movement between the elements and the connecting members and forms a rigid construction.

6. A fuel element assembly comprised of a plurality of elongated, parallel casing members each of which has hollow portions between which are disposed solid portions with the hollow portions having contained therein a fissionable material, said elements being arranged in bidirectional rows, means maintaining the elements of the assembly in fixed, spaced relation to each other including elongated support elements extending laterally of the rows being received in aligned openings in the solid portions of the elements, said support elements having enlarged regions at the locations intermediate the fuel elements and said support elements being effectively joined with the fuel elements in a manner preventing relative movement therebetween.

References Cited by the Examiner

UNITED STATES PATENTS

| | | | |
|---|---|---|---|
| 1,289,607 | 12/18 | Batchelder | 29—433 |
| 2,282,750 | 5/42 | Schueler | 29—433 |
| 2,977,297 | 3/61 | Evans et al. | 176—81 |
| 2,998,369 | 8/61 | Untermyer | 176—75 |
| 3,070,531 | 12/62 | Huet | 176—28 |
| 3,109,797 | 11/63 | Maxwell | 176—69 |

FOREIGN PATENTS 1,259,772   3/61   France.

CARL D. QUARFORTH, *Primary Examiner.*

OSCAR R. VERTIZ, REUBEN EPSTEIN, *Examiners.*